UNITED STATES PATENT OFFICE.

ROBERT GNEHM AND JAKOB SCHMID, OF BASLE, SWITZERLAND, ASSIGNORS TO DR. FR. VON HEYDEN NACHFOLGER, OF RADEBEUL, GERMANY.

CARBONIC-ACID COMPOUND OF DIMETHYL META-AMIDOPHENOL.

SPECIFICATION forming part of Letters Patent No. 427,565, dated May 13, 1890.

Application filed August 16, 1889. Serial No. 320,996. (Specimens.)

*To all whom it may concern:*

Be it known that we, ROBERT GNEHM and JAKOB SCHMID, citizens of Switzerland, residing at Basle, Switzerland, have invented new and useful Improvements in the Production of the Carbonic-Acid Compound of Dimethyl meta-amidophenol, which may be usefully employed in the manufacture of coloring-matters, of which the following is a specification.

For transformation of the alkyl substitution products of the meta-amidophenol in the corresponding monocarbonic-acid compound, the dry soda or potassium combinations are treated with carbonic anhydride at a high temperature under pressure.

The carbonic-acid compound of the dimethyl meta-amidophenol, having the formula

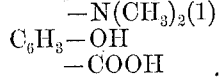

is obtained as follows: Five kilograms dimethyl meta-amidophenol are diluted with the necessary quantity of caustic soda-lye and the solution evaporated. The well-dried mass is carefully pulverized. This is the dimethyl meta-amidophenolate of soda, which is submitted in an autoclave during several hours, at a temperature of 120° to 140° centigrade, to the action of compressed dry carbonic anhydride, whereby the soda salt of the new carbonic acid is produced, and may be extracted by water, filtered, and the solution acidulated with acetic acid, whereupon the carbonic-acid compound of the dimethyl meta-amidophenol precipitates. By crystallization out of hot toluol it is obtained in form of colorless needles, which melt at 145° to 146° centigrade under decomposition in carbonic anhydride and dimethyl meta-amidophenol. It is difficultly soluble in water, easier in hot alcohol, benzol, and toluol. The hydrochloride of the carbonic-acid compound of dimethyl meta-amidophenol and their alkaline salts dissolve easily in water.

By prolongated heating of the carbonic-acid compound of the dimethyl meta-amidophenol in neutral or slightly-aciduated solution the carbonic anhydride is separated out and the dimethyl meta-amidophenol remains.

In analogous manner a carbonic-acid compound from diethyl meta-amidophenol can be obtained.

The above-described carbonic-acid compound can be used for the production of coloring-matters.

What we claim as new and original, and desire to secure by Letters Patent, is—

The carbonic-acid compound of dimethyl meta-amidophenol, which crystallizes in colorless needles, melting at about 145° centigrade under decomposition, difficultly soluble in water, easier in hot alcohol, benzol, and toluol.

In testimony whereof we have hereunto set our hands in the presence of two subscribing witnesses.

ROBERT GNEHM.
JAKOB SCHMID.

Witnesses:
GEORGE GIFFORD,
CHS. A. RICHTER.